US011708884B2

(12) United States Patent
Ullagaddi et al.

(10) Patent No.: US 11,708,884 B2
(45) Date of Patent: Jul. 25, 2023

(54) AXLE ASSEMBLY HAVING AN INTERAXLE DIFFERENTIAL UNIT

(71) Applicant: ArvinMeritor Technology, LLC, Troy, MI (US)

(72) Inventors: Avinash Ullagaddi, Troy, MI (US); Aneesh N. Singaran, Troy, MI (US); Harish C. Patel, Troy, MI (US); Chandrakant Kotagi, Troy, MI (US)

(73) Assignee: ArvinMeritor Technology, LLC, Troy, MI (US)

( * ) Notice: Subject to any disclaimer, the term of this patent is extended or adjusted under 35 U.S.C. 154(b) by 0 days.

(21) Appl. No.: 17/687,867

(22) Filed: Mar. 7, 2022

(65) Prior Publication Data

US 2023/0003290 A1    Jan. 5, 2023

(30) Foreign Application Priority Data

Jul. 2, 2021 (IN) .............................. 202111029777

(51) Int. Cl.
  *F16H 48/08* (2006.01)
  *B60K 17/36* (2006.01)
  *F16H 48/38* (2012.01)
  *F16H 48/40* (2012.01)

(52) U.S. Cl.
  CPC ............. *F16H 48/08* (2013.01); *B60K 17/36* (2013.01); *F16H 48/38* (2013.01); *F16H 48/40* (2013.01)

(58) Field of Classification Search
  CPC .... F16H 48/08–2048/087; F16H 48/24; F16H 48/38; F16H 48/40; F16H 2048/387; B60K 17/36; B60K 17/34–3465
  See application file for complete search history.

(56) References Cited

U.S. PATENT DOCUMENTS

| 4,281,735 | A | * | 8/1981 | Sloma .................... B60K 17/34 180/250 |
| 4,304,317 | A | * | 12/1981 | Vanzant ................. B60K 17/34 180/250 |
| 4,332,304 | A | * | 6/1982 | Barnow ............... B60K 17/352 180/247 |
| 5,161,644 | A | | 11/1992 | Swenskowski et al. |
| 7,291,083 | B2 | * | 11/2007 | Almaguer .............. B60K 17/36 475/221 |
| 8,398,520 | B1 | | 3/2013 | Bassi et al. |

(Continued)

FOREIGN PATENT DOCUMENTS

| EP | 2770229 A1 | 8/2014 |
| EP | 3130501 A2 | 2/2017 |
| EP | 3385559 A1 | 10/2018 |

OTHER PUBLICATIONS

Melekian et al.; U.S. Appl. No. 17/196,178, filed Mar. 9, 2021; 26 Pages.

(Continued)

*Primary Examiner* — Ernesto A Suarez
*Assistant Examiner* — James J Taylor, II
(74) *Attorney, Agent, or Firm* — Brooks Kushman PC

(57) ABSTRACT

An axle assembly having an input shaft, an output shaft, and an interaxle differential unit. The interaxle differential unit includes first and second side gears, a case, and a pinion gear that is rotatably disposed on a pinion pin. The case extends from the input shaft. The pinion pin extends from the case and is spaced apart from the input shaft.

20 Claims, 7 Drawing Sheets

(56) References Cited

U.S. PATENT DOCUMENTS

| | | |
|---|---|---|
| 9,410,605 B2 | 8/2016 | Kluck |
| 9,506,549 B2 | 11/2016 | Chandrashekar et al. |
| 9,719,563 B2 | 8/2017 | Hirao |
| 9,816,603 B2 | 11/2017 | Hayes et al. |
| 10,113,628 B2 | 10/2018 | Kluck et al. |
| 10,156,289 B2 | 12/2018 | De Stefani et al. |
| 10,208,846 B2 | 2/2019 | Chinitz |
| 10,364,872 B2 | 7/2019 | Keeney et al. |
| 10,369,885 B2 | 8/2019 | Keeney et al. |
| 10,378,634 B2 | 8/2019 | Kluck et al. |
| 10,539,218 B2 | 1/2020 | Annigeri et al. |
| 10,557,537 B2 | 2/2020 | Keeney et al. |
| 10,703,202 B2 | 7/2020 | Funderburg et al. |
| 2010/0041506 A1 | 2/2010 | Cooper et al. |
| 2021/0291644 A1 | 9/2021 | Hayes et al. |

OTHER PUBLICATIONS

Extended European Search Report dated Oct. 28, 2022 for related European Appln. No. 22182258.8; 9 Pages.

First Examination Report dated Mar. 29, 2023 for related India Appln. No. 202111029777; 5 Pages.

\* cited by examiner

AXLE ASSEMBLY HAVING AN INTERAXLE DIFFERENTIAL UNIT

TECHNICAL FIELD

This relates to an axle assembly having an interaxle differential unit.

BACKGROUND

An axle assembly having an interaxle differential unit is disclosed in U.S. Pat. No. 9,816,603.

SUMMARY

In at least one embodiment, an axle assembly is provided. The axle assembly includes an input shaft, an output shaft, and an interaxle differential unit. The input shaft and the output shaft are rotatable about an axis. The interaxle differential unit includes a first side gear, a second side gear, a case, a pinion pin, and a pinion gear. The first side gear is rotatable about the axis and is selectively couplable to the input shaft. The second side gear is rotatable about the axis with the output shaft. The case extends from the input shaft and is rotatable about the axis with the input shaft. The pinion pin extends from the case and is spaced apart from the input shaft. The pinion gear is rotatably disposed on the pinion pin and meshes with the first side gear and the second side gear.

In at least one embodiment, an axle assembly is provided. The axle assembly includes an input shaft, an output shaft, and an interaxle differential unit. The input shaft and the output shaft are rotatable about an axis. The interaxle differential unit includes a first side gear, a second side gear, a case, a set of pinion pins, and a set of pinion gears. The first side gear is rotatable about the axis and is selectively couplable to the input shaft. The second side gear is rotatable about the axis with the output shaft. The case is rotatable about the axis with the input shaft. The case includes an inner ring, an outer ring, and a set of ribs. The inner ring extends around and engages the input shaft. The inner ring defines a set of sockets that face away from the input shaft. The outer ring extends around and is spaced apart from the inner ring. The outer ring defines a set of pinion pin holes. The set of ribs extends from the inner ring to the outer ring. Members of the set of sockets and the set of ribs are arranged such that each member of the set of sockets is positioned between two adjacent members of the set of ribs in a direction that extends around the axis. Each pinion pin is received in a corresponding member of the set of sockets and a corresponding member of the set of pinion pin holes. Each pinion gear is rotatable with respect to a corresponding pinion pin and meshes with the first side gear and the second side gear.

DETAILED DESCRIPTION

As required, detailed embodiments of the present invention are disclosed herein; however, it is to be understood that the disclosed embodiments are merely exemplary of the invention that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present invention.

Figure 1:
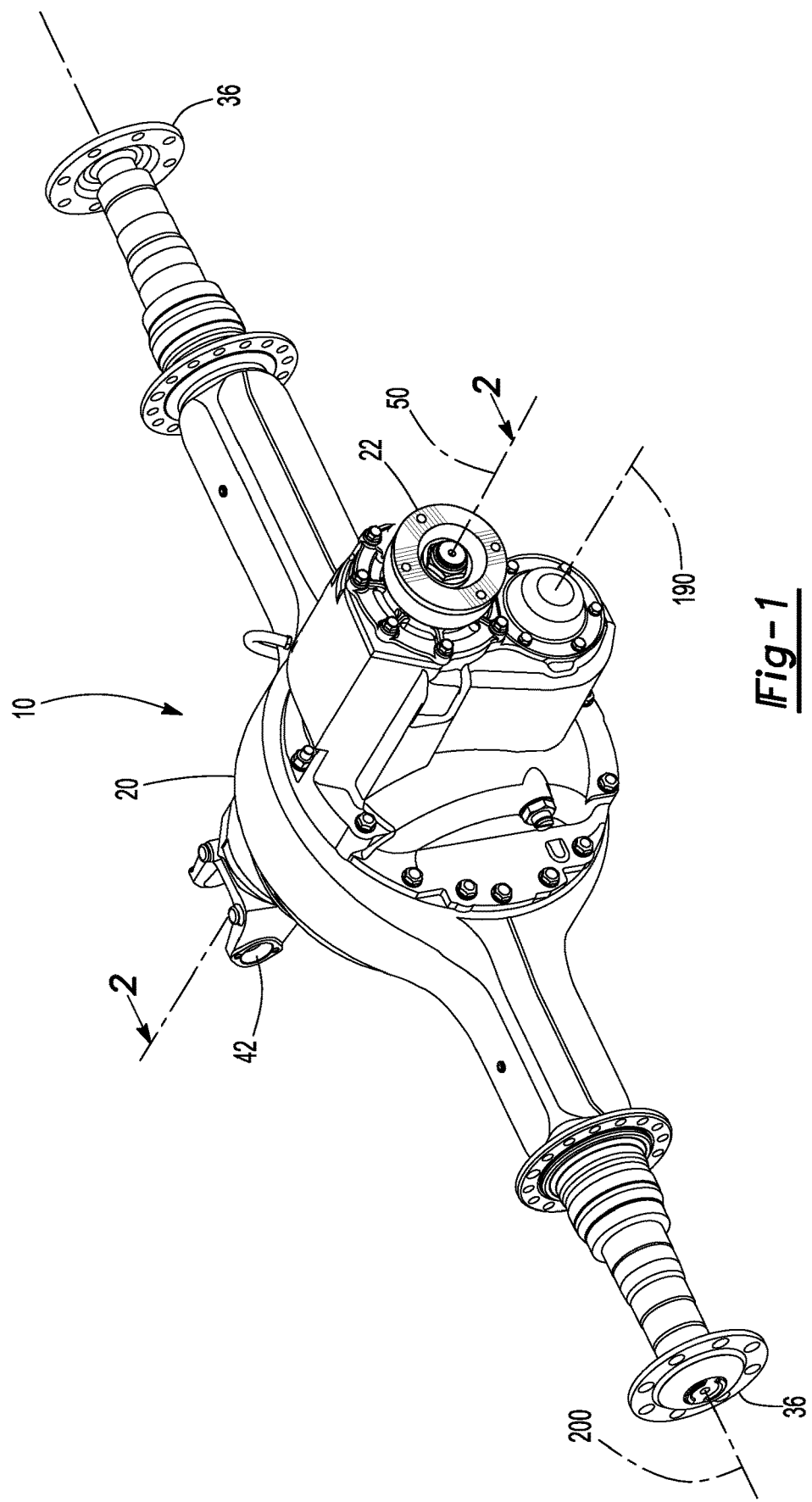
FIG. 1 is a perspective view of an example of an axle assembly.

Referring to FIG. 1, an example of an axle assembly 10 is shown. The axle assembly 10 may be provided with a vehicle of any suitable type, such as a truck, bus, farm equipment, military transport or weaponry vehicle, or cargo loading equipment for land, air, or marine vessels.

The axle assembly 10 may be part of a vehicle drivetrain that may include multiple axle assemblies that may be connected in series. For instance, the axle assembly 10 may be part of a tandem axle drivetrain configuration that may include two axle assemblies connected in series. The axle assembly 10 that is operatively connected to at least one torque source, such as an electric motor or an internal combustion engine, or that is disposed closest to a torque source may be referred to as a first axle assembly. The axle assembly that receives propulsion torque from the torque source through or by way of the first axle assembly may be referred to as a second axle assembly. In FIG. 1, the axle assembly 10 is depicted as being a first axle assembly.

The axle assembly 10 may provide torque to its associated wheel assemblies and may provide torque to the second axle assembly. In at least one configuration and as is best shown with reference to FIG. 2, the axle assembly 10 may include a housing 20, an input yoke 22, an input shaft 24, an interaxle differential unit 26, a clutch collar 28, a driven gear 30, a drive pinion 32, a differential assembly 34, at least one axle shaft 36, an output shaft 40, an output yoke 42, or combinations thereof.

Figure 2:
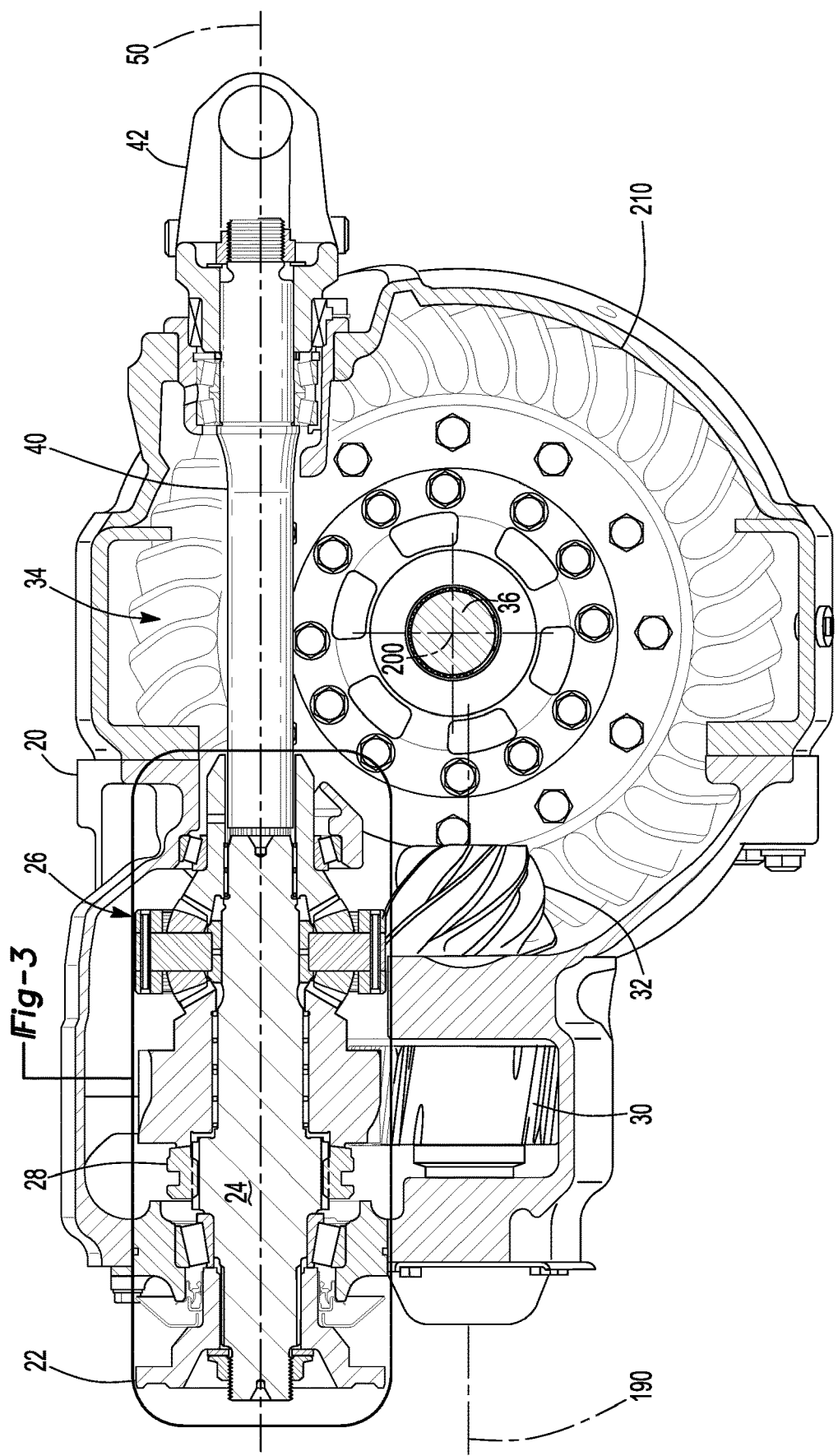
FIG. 2 is a section view of the axle assembly along section line 2-2.

Referring to FIGS. 1 and 2, the housing 20 may receive various components of the axle assembly 10. In addition, the housing 20 may facilitate mounting of the axle assembly 10 to the vehicle.

The input yoke 22, if provided, may facilitate coupling of the axle assembly 10 to a torque source. The input yoke 22 may have any suitable configuration. For instance, the input yoke 22 may have a disc configuration as shown or may have a similar configuration as the output yoke 42. It is contemplated that the input yoke 22 may be omitted, such as when a torque source like an electric motor is integrated with the axle assembly 10. If provided, the input yoke 22 may be operatively connected to the input shaft 24.

Figure 3:
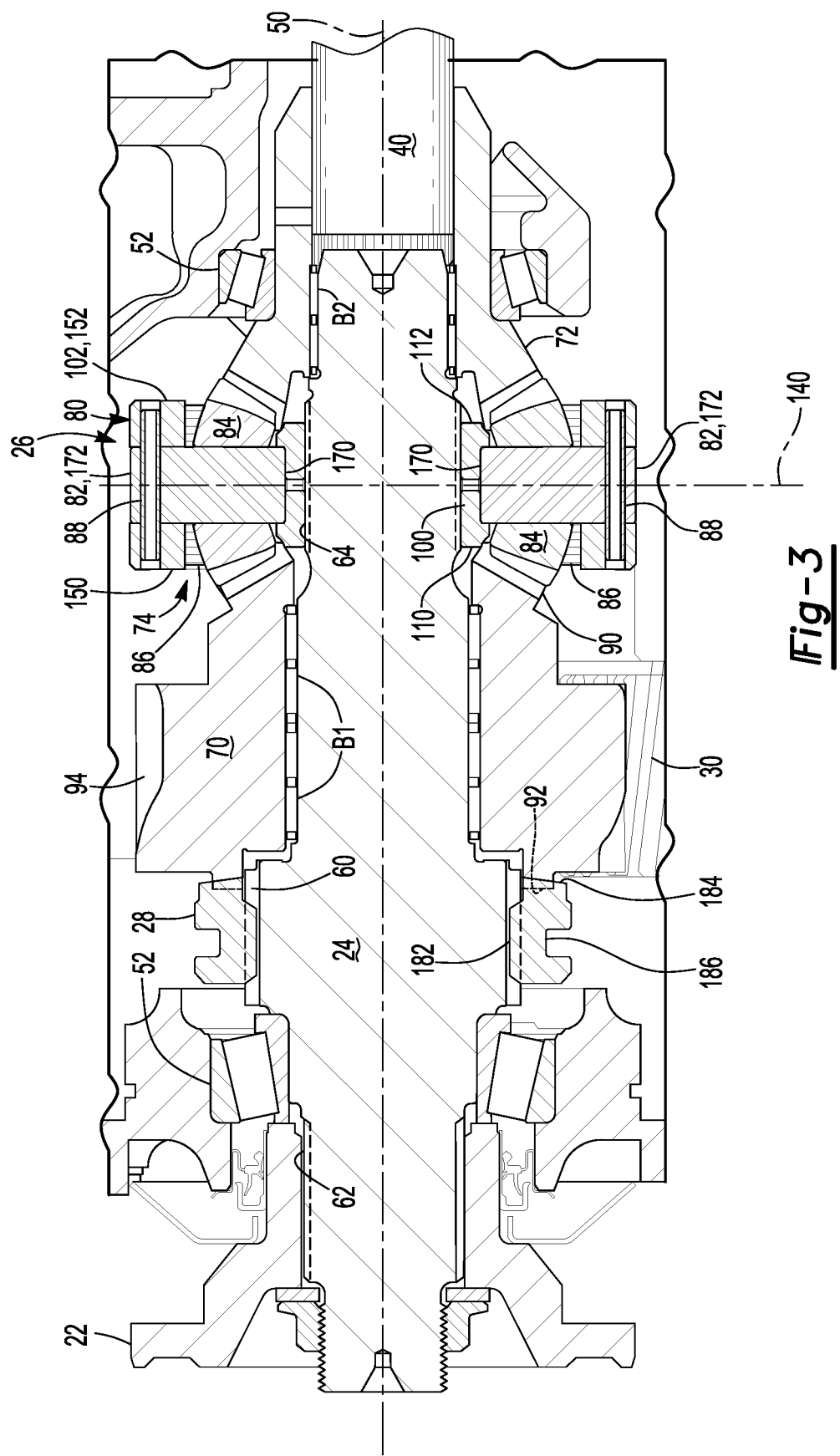
FIG. 3 is a magnified view of a portion of FIG. 2 showing an example of an interaxle differential unit.
Figure 4:
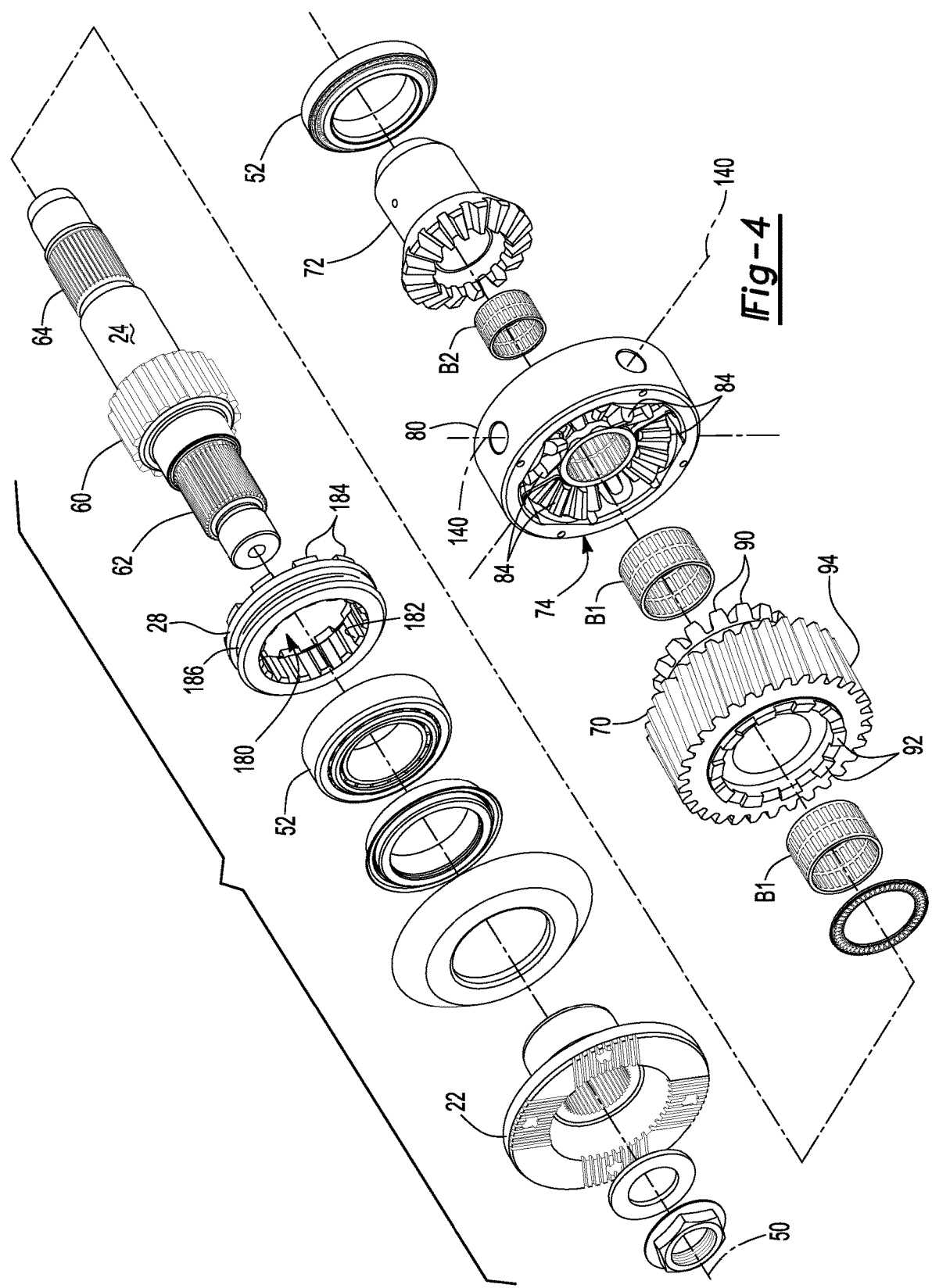
FIGS. 4 and 5 are exploded views of components shown in FIG. 3.
Figure 5:
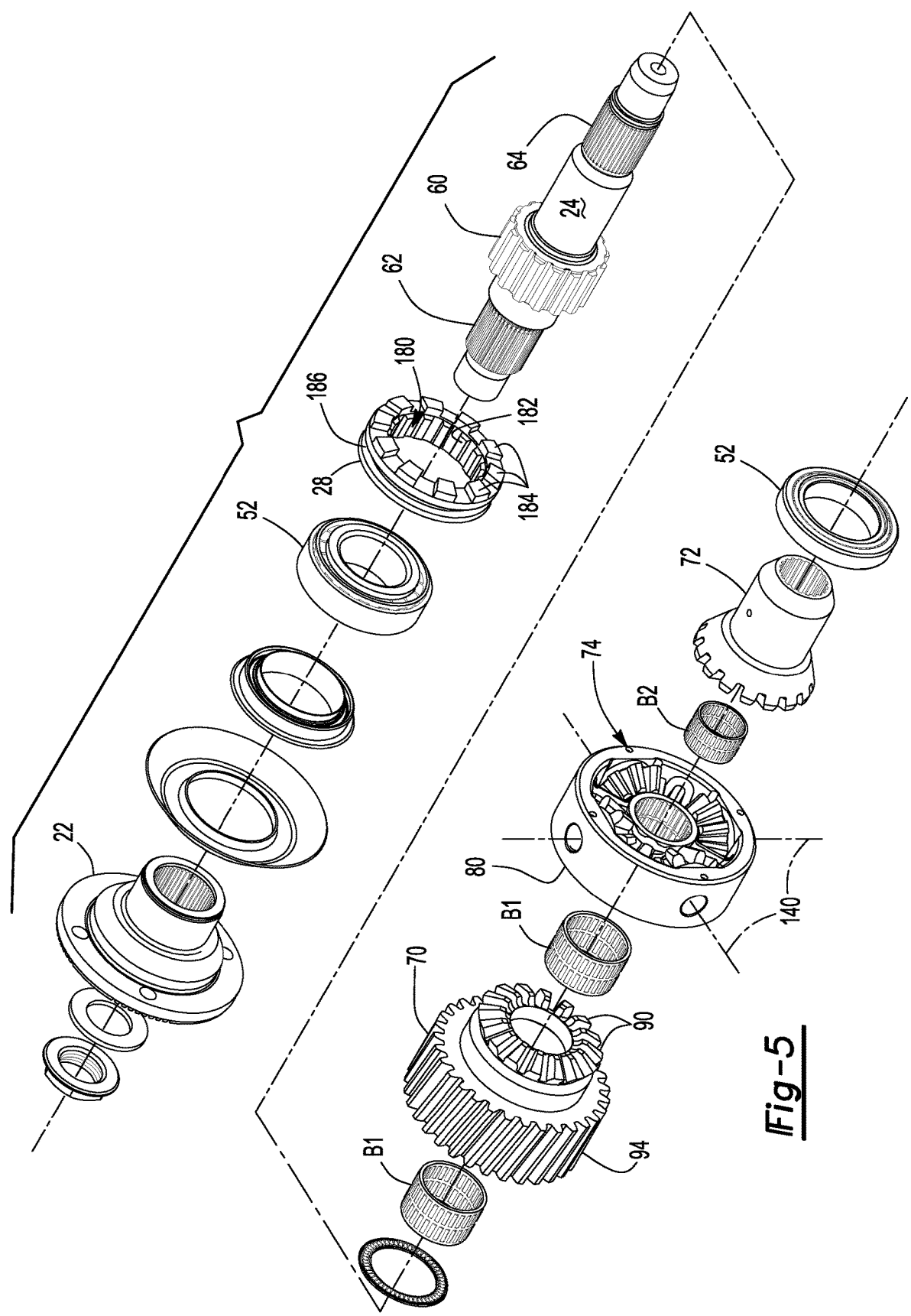

Referring primarily to FIGS. 3-5, an example of an input shaft 24 is shown. The input shaft 24 may extend along and may be rotatable about an axis 50. For example, the input shaft 24 may be rotatably supported by one or more bearings 52 that may be disposed on the housing 20. The input shaft 24 may be operatively connected to the driven gear 30 and the output shaft 40 via the interaxle differential unit 26. In at least one configuration and as is best shown in FIGS. 4 and 5, the input shaft 24 may include at least one spline, such as a first spline 60, a second spline 62, a third spline 64, or combinations thereof. A spline may have teeth that may be arranged around the axis 50, may extend away from the axis 50, may be disposed substantially parallel to the axis 50, or combinations thereof. The term "substantially parallel" as used herein means the same as or very close to parallel and includes features or axes that are within ±2° of being parallel each other.

The first spline 60 may engage the clutch collar 28 such that the clutch collar 28 may be rotatable about the axis 50 with the input shaft 24. Moreover, the first spline 60 may permit the clutch collar 28 to move in an axial direction or a direction that extends along the axis 50 with respect to the input shaft 24.

The second spline 62, if provided, may engage the input yoke 22. For instance, the second spline 62 may mate or mesh with a corresponding spline of the input yoke 22 such that the input yoke 22 may be rotatable about the axis 50 with the input shaft 24.

The third spline 64, if provided, may engage a case of the interaxle differential unit 26 as will be discussed in more detail below.

Referring primarily to FIGS. 2 and 3, an example of an interaxle differential unit 26 is shown. The interaxle differential unit 26 may accommodate or compensate for rotational speed differences between different drive axle assemblies, such as speed differences between the axle assembly 10 and a second axle assembly that is connected in series with the axle assembly 10. As an example, the interaxle differential unit 26 may operatively connect the input shaft 24 and the output shaft 40 and may allow the input shaft 24 and output shaft 40 to rotate at different speeds with respect to each other under various operating conditions. The interaxle differential unit 26 may be provided in various locations. In FIG. 2, the interaxle differential unit 26 is disposed inside the housing 20 on the input shaft 24; however, it is contemplated that the interaxle differential unit 26 may be provided in other locations, such as closer to the output yoke 42 or with the second axle assembly. It is also contemplated that interaxle differential unit 26 may be disposed on another shaft. In at least one configuration and as is best shown in FIG. 3, the interaxle differential unit 26 may include a first side gear 70, a second side gear 72, and a gear nest 74. The gear nest 74 may include a case 80, at least one pinion pin 82, and at least one pinion gear 84. Additionally, one or more washers 86 and one or more retainer pins 88 may be provided.

Referring to FIGS. 3-5, the first side gear 70 may be rotatable about the axis 50. For instance, the first side gear 70 may have a center bore that may receive or encircle the input shaft 24. Optionally one or more bearings B1 may be received in the center bore and may rotatably support the first side gear 70 on the input shaft 24. The first side gear 70 may be rotatable with respect to the case 80. In addition, the first side gear 70 may be selectively couplable to the input shaft 24. In at least one configuration, the first side gear 70 may include side gear teeth 90, face gear teeth 92, and a drive gear 94.

The side gear teeth 90 may be arranged around the axis 50 and may mate or mesh with the teeth of at least one pinion gear 84. The side gear teeth 90 may be at least partially disposed outside the case 80.

The face gear teeth 92 may be disposed proximate a first end of the first side gear 70 that may face away from the gear nest 74. For instance, the face gear teeth 92 may be disposed on an opposite side of the first side gear 70 from the side gear teeth 90. As such, the face gear teeth 92 may be disposed outside of the case 80 and may extend toward the clutch collar 28. The face gear teeth 92 may be selectively engaged by the clutch collar 28 as will be discussed in more detail below.

The drive gear 94 may have teeth that may be arranged around the axis 50 and that may extend away from and face away from the axis 50. As is best shown in FIG. 3, teeth of the drive gear 94 may mate or mesh with teeth of driven gear 30. The drive gear 94 may be part of the first side gear 70 and may be integrally formed with the first side gear 70 as a unitary one-piece component. In at least one configuration, the drive gear 94 may be axially positioned closer to the face gear teeth 92 than to the side gear teeth 90.

Referring to FIGS. 3-5, the second side gear 72 may be rotatable about the axis 50 with the output shaft 40. For example, the second side gear 72 may extend along the axis 50 and may have a center bore that may receive or encircle an end of the output shaft 40 and optionally an end of the input shaft 24. Optionally one or more bearings B2 may be received in the center bore and may rotatably support the second side gear 72 on the input shaft 24. The center bore may also include a spline or splined portion that may be spaced apart from the input shaft 24 and that may mate with a corresponding spline of another shaft, such as the output shaft 40. As such, the second side gear 72 may be inhibited from rotating about the axis 50 with respect to the output shaft 40. The second side gear 72 may be rotatable with respect to the case 80.

Figure 6:
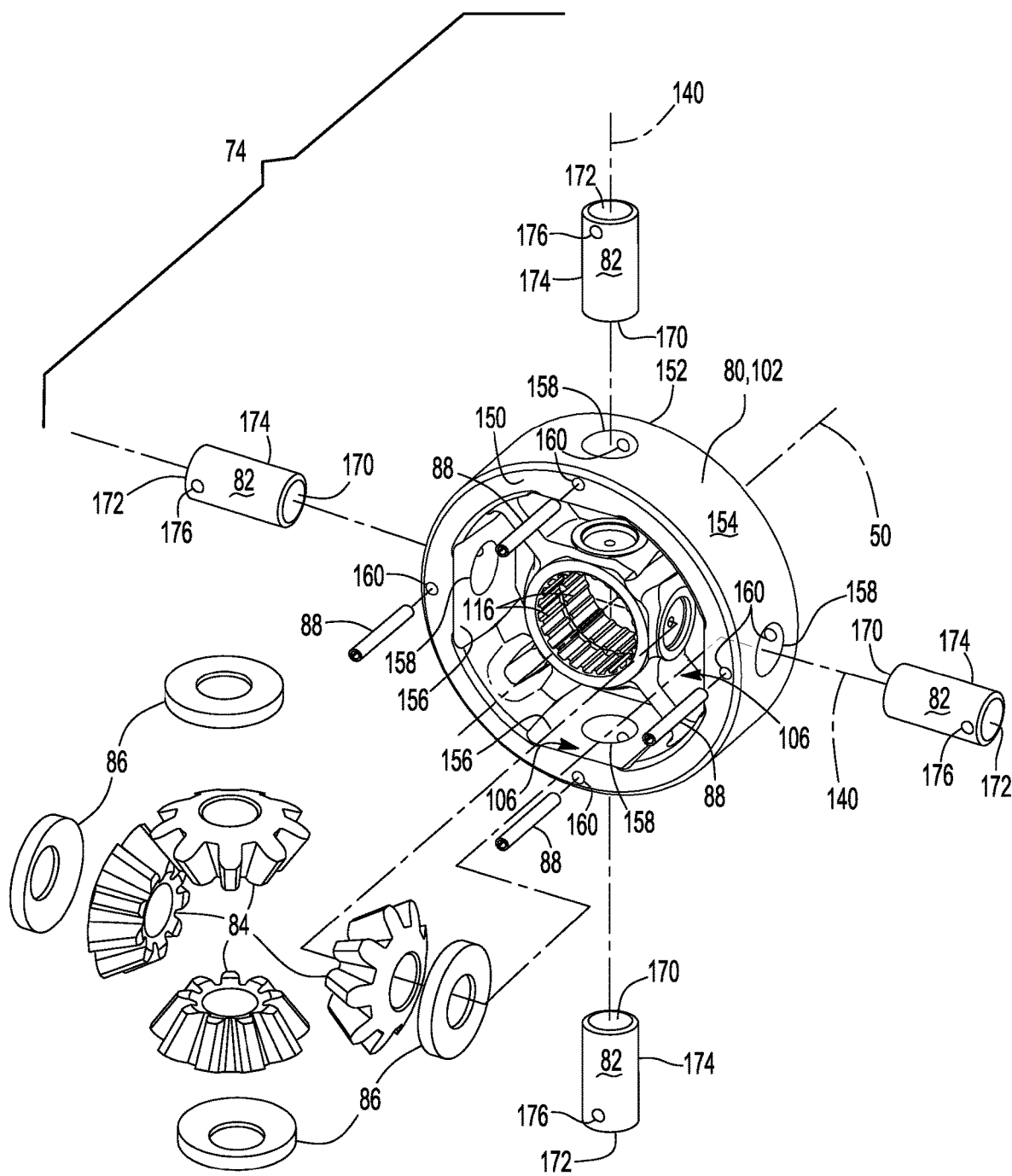
FIG. 6 is an exploded perspective view of a gear nest of the interaxle differential unit.
Figure 7:
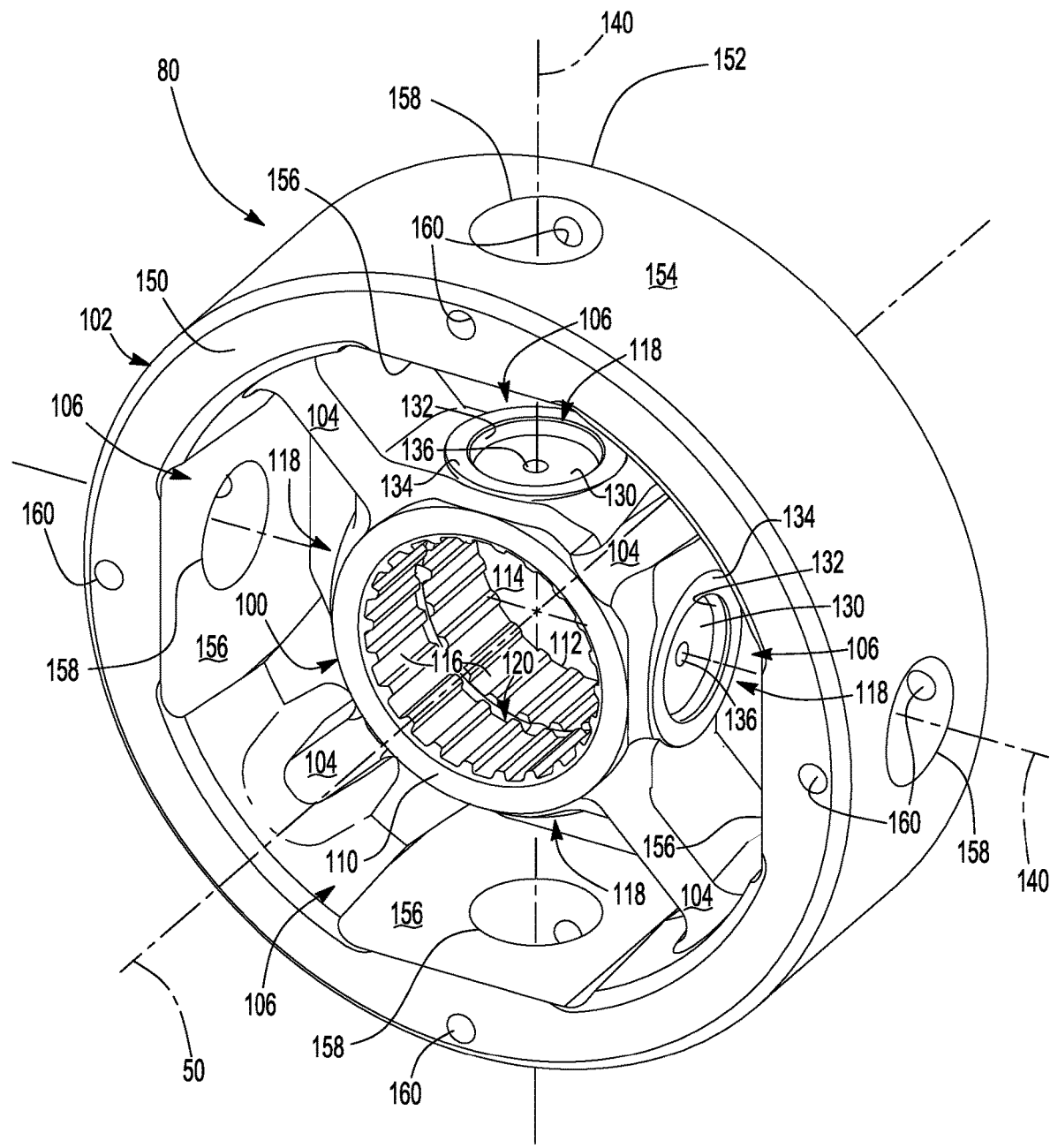
FIG. 7 is a perspective view of a case of the gear nest of the interaxle differential unit.

Referring primarily to FIGS. 3, 6, and 7, the case 80 may receive components of the gear nest 74 of the interaxle differential unit 26. For instance, the case 80 may receive and support the pinion pins 82, pinion gears 84, washers 86, retainer pins 88 or combinations thereof. The case 80 may be a single unitary one-piece component and may not be an assembly of multiple parts. The case 80 may extend from or may contact the input shaft 24 and may be rotatable about the axis 50 with the input shaft 24. In at least one configuration and as is best shown with reference to FIGS. 6 and 7, the case 80 may include an inner ring 100, an outer ring 102, and one or more ribs 104. As is best shown in FIG. 7, the case 80 may define a plurality of cavities 106.

Referring primarily to FIGS. 3, 6, and 7, the inner ring 100 may extend around or encircle the input shaft 24 and the axis 50. In addition, the inner ring 100 may engage the input shaft 24. In at least one configuration, the inner ring 100 may have a first inner ring end 110 and a second inner ring end 112 and may define an inner ring hole 114, an inner ring spline 116, and at least one socket 118.

The first inner ring end 110 may face toward the first side gear 70 or to the left from the perspective shown in FIG. 3. The first inner ring end 110 may extend around the axis 50.

The second inner ring end 112 may be disposed at an opposite end of the inner ring 100 from the first inner ring end 110. As such, the second inner ring end 112 may face away from the first side gear 70 and may face toward the second side gear 72. The second inner ring end 112 may extend around the axis 50.

Referring primarily to FIG. 7, the inner ring hole 114 may extend along or around the axis 50. The inner ring hole 114 may extend between the first inner ring end 110 and the second inner ring end 112. For instance, the inner ring hole 114 may extend from the first inner ring end 110 to the second inner ring end 112. The input shaft 24 may be received inside and may extend through the inner ring hole 114.

The inner ring spline 116 may be disposed in the inner ring hole 114. The inner ring spline 116 may include a plurality of teeth that may be arranged around the axis 50 and that may extend toward the axis 50. The teeth of the inner ring spline 116 may extend between the first inner ring end 110 toward the second inner ring end 112. For instance, the inner ring spline 116 may extend from the first inner ring end 110 toward the second inner ring end 112, from the second inner ring end 112 toward the first inner ring end 110, or both. In the configuration shown, the inner ring spline 116 is separated into two groups with one group extending from the first inner ring end 110 to a spline gap 120 and a second group extending from the second inner ring end 112 to the spline gap 120. The inner ring spline 116 may engage a corresponding spline on the input shaft 24 to inhibit rotation of the case 80 with respect to the input shaft 24. For example, the teeth of the inner ring spline 116 may mate or mesh with the teeth of the third spline 64 of the input shaft 24, which is best shown in FIGS. 3-5 to inhibit rotation of the case 80 about the axis 50 with respect to the input shaft 24.

Referring primarily to FIG. 7, a set of one or more sockets 118 may be provided with the inner ring 100. A socket 118 may be disposed opposite the inner ring hole 114 and may face away from the input shaft 24. The socket 118 may be configured to receive a corresponding pinion pin 82 as will be discussed in more detail below. In at least one configuration, the socket 118 may be at least partially defined by a socket bottom surface 130, a socket side surface 132, and a socket top surface 134.

The socket bottom surface 130 may be disposed at the bottom of the socket 118. As such, the socket bottom surface 130 may be disposed closer to the axis 50 than the socket side surface 132, the socket top surface 134, or both. The socket bottom surface 130 may be spaced apart from the first inner ring end 110, the second inner ring end 112, the inner ring hole 114, the inner ring spline 116, or combinations thereof. The socket bottom surface 130 may be disposed further from the axis 50 than the inner ring hole 114 and may extend substantially parallel to the axis 50 in one or more configurations. The socket bottom surface 130 may engage or contact an end of a pinion pin 82 to limit or inhibit movement of a pinion pin 82 toward the axis 50.

Optionally, one or more through holes 136 may extend from the socket bottom surface 130 to the inner ring hole 114. The through hole 136 may extend to the inner ring spline 116, the spline gap 120, or combinations thereof. The through hole 136 may have a smaller diameter than the socket side surface 132.

The socket side surface 132 may extend from the socket bottom surface 130 in a direction that extends away from the axis 50. For instance, the socket side surface 132 may extend from the socket bottom surface 130 to the socket top surface 134. The socket side surface 132 may encircle the socket bottom surface 130 and may encircle a portion of a pinion pin 82 that is received in the socket 118. In at least one configuration, the socket side surface 132 may be radially disposed with respect to an associated center axis 140. The center axis 140 may be disposed substantially perpendicular to the axis 50. The term "substantially perpendicular" is used herein to designate features or axes that are the same as or very close to perpendicular and includes features that are within ±2° of being perpendicular each other. The through hole 136, if provided, may extend along the center axis 140.

The socket top surface 134 may extend from the socket side surface 132 in a direction that extends away from the center axis 140. The socket top surface 134 may be disposed further from the axis 50 than the socket bottom surface 130. In at least one configuration, the socket top surface 134 may encircle the socket side surface 132. In at least one configu-ration, the socket top surface 134 may be spaced apart from and may not engage a corresponding pinion pin 82. The socket top surface 134 may be narrower than the inner ring 100. For instance, the axial length or length along the axis 50 from the first inner ring end 110 to the second inner ring end 112 may be greater than the axial length of the socket 118 and the socket top surface 134 along the axis 50.

The outer ring 102 may encircle the inner ring 100. As such, the outer ring 102 may be disposed further from the axis 50 than the inner ring 100. In addition, the outer ring 102 may be spaced apart from the inner ring 100 and the input shaft 24. In at least one configuration, the outer ring 102 may define a first outer ring end 150, a second outer ring end 152, an outer surface 154, at least one support surface 156, at least one pinion pin hole 158, and at least one retainer hole 160.

The first outer ring end 150 may face toward the first side gear 70 or to the left from the perspective shown in FIG. 3. In at least one configuration, the first outer ring end 150 may be disposed further from the center axis 140 than the first inner ring end 110 is disposed from the center axis 140. The first outer ring end 150 may extend around and may encircle the axis 50.

The second outer ring end 152 may be disposed at an opposite end of the outer ring 102 from the first outer ring end 150. As such, the second outer ring end 152 may face away from the first side gear 70 and may face toward the second side gear 72. The second outer ring end 152 may extend around and may encircle the axis 50. In at least one configuration, the second outer ring end 152 may be disposed further from the center axis 140 than the second inner ring end 112 is disposed from the center axis 140. As such, the outer ring 102 may have a greater axial length or length in a direction that extends along the axis 50 than the inner ring 100.

Referring primarily to FIGS. 6 and 7, the outer surface 154 may face away from the axis 50 and may extend around the axis 50. In addition, the outer surface 154 may extend between the first outer ring end 150 and the second outer ring end 152. For instance, the outer surface 154 may extend from the first outer ring end 150 to the second outer ring end 152.

At least one support surface 156 may be provided with the outer ring 102. The support surface 156 may face toward the axis 50 and the inner ring 100. As such, the support surface 156 may be disposed opposite the outer surface 154. In addition, the support surface 156 may extend between the first outer ring end 150 and the second outer ring end 152. For instance, the support surface 156 may extend from the first outer ring end 150 to the second outer ring end 152. A support surface 156 may encircle a pinion pin hole 158. In the configuration shown, four support surfaces 156 are illustrated; however, it is contemplated that a greater or lesser number of support surfaces may be provided. The support surfaces 156 may be separated from each other. For instance, a rib 104 may be disposed between and may help separate one support surface 156 from an adjacent support surface. In at least one configuration, each support surface 156 may be substantially planar and may be disposed substantially parallel to the axis 50. Each support surface 156 may face toward and may be disposed substantially parallel to a corresponding socket top surface 134.

A set of one or more pinion pin holes 158 may be defined by the outer ring 102. A pinion pin hole 158 may receive a pinion pin 82. The pinion pin hole 158 may extend from the support surface 156 toward or to the outer surface 154. Each pinion pin hole 158 may extend along a corresponding center axis 140 and may be aligned with a corresponding socket 118.

The retainer hole 160 may extend from a pinion pin hole 158 to the first outer ring end 150, the second outer ring end 152, or both. The retainer hole 160 may be positioned closer to the axis 50 than the outer surface 154 is positioned to the axis 50 and may be positioned further from the axis 50 than the support surface 156 is positioned from the axis 50. In at least one configuration, the retainer hole 160 may be disposed substantially parallel to the axis 50. The retainer hole 160 may receive a retainer pin 88 that may engage and may extend into the pinion pin 82 to inhibit movement of the pinion pin 82 with respect to the case 80. The retainer pin 88 may have any suitable configuration. For instance, the retainer pin 88 may be configured as a shaft or pin like a roll pin.

Referring primarily to FIG. 7, a set of one or more ribs 104 may connect the inner ring 100 to the outer ring 102. In at least one configuration, a rib 104 may extend in a direction that extends away from the axis 50 from the inner ring 100 to the outer ring 102. In at least one configuration, each member of the set of ribs 104 may be disposed substantially perpendicular to the axis 50. Optionally, each member of the set of ribs 104 may be aligned with or may be coaxially disposed with one other member of the set of ribs 104 that is disposed on an opposite side of the axis 50 and inner ring 100. A rib 104 may be integrally formed with the inner ring 100, the outer ring 102, or both. In the configuration shown, four ribs 104 are illustrated; however, it is contemplated that a greater or lesser number of ribs may be provided. Each rib 104 may be spaced apart from the sockets 118 of the inner ring 100, the support surfaces 156 of the outer ring 102, or both. A rib 104 may have a shorter axial length or length in a direction that extends along the axis 50 than the inner ring 100, the outer ring 102, or both. For instance, a rib 104 may be spaced apart from the first and second inner ring ends 110, 112, the first and second outer ring ends 150, 152, or both. In such a configuration, the inner ring 100 may have a greater axial length than the rib 104.

In at least one configuration and as is best shown with reference to FIGS. 6 and 7, the case 80 may define a plurality of cavities 106 when two or more ribs 104 are provided. Each cavity 106 may be bounded by the inner ring 100, the outer ring 102, and two members of the set of ribs 104. Each cavity 106 may receive at least one pinion pin 82 and at least one pinion gear 84. In the configuration shown, each cavity 106 receives one pinion pin 82 and one pinion gear 84. In such a configuration, members of the set of ribs 104 and the set of sockets 118 may be arranged in an alternating relationship such that each member of the set of sockets 118 is positioned between two adjacent members of the set of ribs 104 in a direction that extends around the axis 50.

Referring primarily to FIGS. 3 and 6, a set of one or more pinion pins 82 may the mounted to the case 80. A pinion pin 82 may be a separate component from the case 80 and may extend between the inner ring 100 and the outer ring 102. Each pinion pin 82 may be partially received inside a corresponding socket 118 of the inner ring 100 and may be partially received inside a corresponding pinion pin hole 158 of the outer ring 102. Moreover, each pinion pin 82 may be spaced apart from the input shaft 24 and may not extend into the inner ring hole 114. A pinion pin 82 may have any suitable configuration. In the configuration shown, each pinion pin 82 has a cylindrical configuration and extends along a corresponding center axis 140. In at least one configuration, the pinion pin 82 may have a first end surface 170, a second end surface 172, an outer surface 174, and a retainer pin hole 176.

The first end surface 170 may engage the inner ring 100. For instance, the first end surface 170 may be received inside the socket 118 and engage or contact the socket bottom surface 130.

The second end surface 172 may be disposed opposite the first end surface 170. In at least one configuration, the second end surface 172 may be received inside a pinion pin hole 158 in the outer ring 102.

Referring primarily to FIG. 6, the outer surface 174 may extend between the first end surface 170 and the second end surface 172. The outer surface 174 may face toward and may engage the socket side surface 132 and a surface that defines the pinion pin hole 158.

The retainer pin hole 176 may extend from the outer surface 174. The retainer pin hole 176 may be aligned with the retainer hole 160 of the outer ring 102. The retainer pin 88 may be received in the retainer hole 160 of the outer ring 102 and the retainer pin hole 176 of the pinion pin 82 to secure the pinion pin 82 and inhibit removal of the pinion pin 82 from the retainer hole 160. As such, the pinion pin 82 may be mounted to the case 80 such that the pinion pin 82 is rotatable about the axis 50 with the case 80.

Referring primarily to FIGS. 3 and 6, a set of one or more pinion gears 84 may be provided with the gear nest 74. Each pinion gear 84 may be rotatable with respect to the case 80 and with respect to a corresponding pinion pin 82. For instance, the pinion gear 84 may define a hole that may receive a corresponding pinion pin 82 in a manner that permits the pinion gear 84 to rotate about the pinion pin 82 and a corresponding center axis 140. The pinion gear 84 may mesh with the first side gear 70 and the second side gear 72. For instance, the pinion gear 84 may include teeth that may mesh or mate with the side gear teeth 90 of the first side gear 70 and may mesh or mate with teeth of the second side gear 72.

A washer 86 may be disposed between a pinion gear 84 and the outer ring 102. For instance, a washer 86 may extend from a pinion gear 84 to a corresponding support surface 156 of the outer ring 102. The washer 86 may encircle a corresponding pinion pin 82.

Referring to FIGS. 3-5, the clutch collar 28, if provided, may be rotatable about the axis 50 with the input shaft 24. In addition, the clutch collar 28 may be moveable along the axis 50 to engage or disengage a first side gear 70 of the interaxle differential unit 26. The clutch collar 28 may be disposed outside of the case 80 of the interaxle differential unit 26 and may be separated from and may not be engageable with the case 80 and its drive gear 94. In at least one configuration, the clutch collar 28 may be generally ring-shaped and may define a clutch collar hole 180, a clutch collar spline 182, a clutch collar face gear 184, and an annular groove 186.

Referring primarily to FIGS. 4 and 5, the clutch collar hole 180 may extend around the axis 50. The clutch collar hole 180 may receive the input shaft 24.

Referring primarily to FIGS. 3-5, the clutch collar spline 182 may be disposed in the clutch collar hole 180. The clutch collar spline 182 may include a plurality of spline teeth that may extend toward the axis 50 and that may mate or mesh with the teeth of the first spline 60 of the input shaft 24. As such, the clutch collar 28 may be rotatable about the axis 50 with the input shaft 24 and may be moveable along the axis 50 or moveable in an axial direction with respect to the input shaft 24.

The clutch collar face gear 184 may include a set of teeth that may be arranged around the axis 50 and that may face toward and extend toward the interaxle differential unit 26. The teeth of the clutch collar face gear 184 may selectively engage the face gear teeth 92 of a first side gear 70 of the interaxle differential unit 26. The clutch collar 28 may move between an unlocked position and a locked position. The clutch collar face gear 184 may be disengaged from the face gear teeth 92 of the first side gear 70 when the clutch collar 28 is in the unlocked position, thereby permitting the first side gear 70 to rotate about the axis 50 with respect to the input shaft 24. The clutch collar face gear 184 may engage and mate or mesh with the face gear teeth 92 of the first side gear 70 when the clutch collar 28 is in the locked position, thereby inhibiting the first side gear 70 from rotating about the axis 50 with respect to the input shaft 24.

The annular groove 186, if provided, may receive a linkage, such as a fork, that may operatively connect the clutch collar 28 to an actuator that may position the clutch collar 28 along the axis 50.

Referring to FIG. 2, the driven gear 30 may be rotatable about a second axis 190. For example, the drive pinion 32 may be received in a center bore of the driven gear 30 and the driven gear 30 may be fixedly disposed on the drive pinion 32 or may be couplable to the drive pinion 32 such that the driven gear 30 and the drive pinion 32 may rotate together about the second axis 190. The driven gear 30 may include a plurality of teeth that may be generally arranged about an outside diameter of the driven gear 30 and that may mate or mesh with the teeth of the drive gear 94. The second axis 190 may be disposed substantially parallel to the axis 50.

The drive pinion 32 may help operatively connect the torque source to the differential assembly 34. The drive pinion 32 may be spaced apart from the input shaft 24 and may be configured to rotate about an axis, such as a second axis 190. The drive pinion 32 may be rotatable with the driven gear 30. A gear portion having teeth may be disposed at an end of the drive pinion 32.

The differential assembly 34 may be at least partially received in the housing 20. The differential assembly 34 may be rotatable about an axis, such as a differential axis 200 that may be disposed substantially perpendicular to the second axis 190. The differential assembly 34 may transmit torque to the axle shafts 36 and wheels. For example, the differential assembly 34 may be operatively connected to the axle shafts 36 and may permit the axle shafts 36 to rotate at different rotational speeds in a manner known by those skilled in the art. The differential assembly 34 may have a ring gear 210 that may have teeth that may mate or mesh with the teeth of the gear portion of the drive pinion 32. Accordingly, the differential assembly 34 may receive torque from the drive pinion 32 via the ring gear 210 and transmit torque to the axle shafts 36.

Referring to FIGS. 1 and 2, the axle shafts 36 may transmit torque from the differential assembly 34 to corresponding wheel hubs and wheels. The axle shafts 36 may extend along and may be rotatable about an axis, which may be the differential axis 200. Each axle shaft 36 may have a first end and a second end. The first end may be operatively connected to the differential assembly 34. The second end may be disposed opposite the first end and may be operatively connected to a wheel.

Referring to FIG. 2, the output shaft 40 may extend along and may be rotatable about the axis 50. For instance, the output shaft 40 may be supported by one or more bearings that may be disposed on the housing 20. The output shaft 40 may be operatively connected to the interaxle differential unit 26. For example, the output shaft 40 may be coupled to the second side gear 72 and may be rotatable about the axis 50 with the second side gear 72.

Referring to FIGS. 1 and 2, the output yoke 42 may facilitate coupling of the axle assembly 10 to another axle assembly. For instance, the output yoke 42 may be fixedly coupled to the output shaft 40 in any suitable manner, such as with mating splines and a fastener like a nut. The output yoke 42 may be operatively connected to a second axle assembly in any suitable manner, such as via a prop shaft. The output yoke 42 may have any suitable configuration. For instance, the output yoke 42 may have a configuration similar to that shown or may have a disc configuration similar to that depicted for the input yoke 22.

An axle assembly as described above allows an interaxle differential unit to be provided without a spider, such as a spider that has a central ring that encircles an axis of rotation and has one or more shafts or pins that may be integrally formed with the central ring, extend away from the axis of rotation, and about which a pinion gear may rotate. Eliminating a spider with integrally-formed pins may prevent a pin from fracturing and/or separating from the central ring, the case of the interaxle differential unit, or both, which in turn may improve the durability of the interaxle differential unit. In addition, such a configuration may allow an interaxle differential unit to be provided with fewer parts than interaxle differential unit designs that have a spider, which may help reduce assembly time of the interaxle differential unit.

While exemplary embodiments are described above, it is not intended that these embodiments describe all possible forms of the invention. Rather, the words used in the specification are words of description rather than limitation, and it is understood that various changes may be made without departing from the spirit and scope of the invention. Additionally, the features of various implementing embodiments may be combined to form further embodiments of the invention.

What is claimed is:

1. An axle assembly comprising:
   an input shaft that is rotatable about an axis;
   an output shaft that is rotatable about the axis; and
   an interaxle differential unit that includes:
   a first side gear that is rotatable about the axis and is selectively couplable to the input shaft;
   a second side gear that is rotatable about the axis with the output shaft;
   a case that extends from the input shaft and that is rotatable about the axis with the input shaft, wherein the case includes an inner ring that engages the input shaft, an outer ring that is spaced apart from the inner ring, and a rib that extends from the inner ring to the outer ring;
   a pinion pin that extends from the case and that is spaced apart from the input shaft; and
   a pinion gear that is rotatably disposed on the pinion pin and that meshes with the first side gear and the second side gear.

2. The axle assembly of claim 1 wherein the case includes a second rib that extends from the inner ring to the outer ring, and the pinion gear is received in a cavity that is bounded by the rib, the second rib, the inner ring, and the outer ring.

3. The axle assembly of claim 1 wherein the inner ring encircles the input shaft and the outer ring encircles the inner ring.

4. The axle assembly of claim 1 wherein the inner ring defines an inner ring hole and an inner ring spline that is disposed in the inner ring hole and that engages the input shaft to inhibit rotation of the case with respect to the input shaft.

5. The axle assembly of claim 1 wherein the outer ring has a greater axial length in a direction that extends along the axis than the inner ring.

6. The axle assembly of claim 1 wherein the inner ring has a greater axial length in a direction that extends along the axis than the rib.

7. The axle assembly of claim 1 wherein the outer ring defines a pinion pin hole and the pinion pin is received inside the pinion pin hole.

8. The axle assembly of claim 1 wherein the inner ring defines an inner ring hole that extends along the axis and a socket that is disposed opposite the inner ring hole, wherein the pinion pin is received inside the socket.

9. The axle assembly of claim 8 wherein the socket is at least partially defined by a socket bottom surface and a socket side surface that extends from the socket bottom surface in a direction that extends away from the axis.

10. The axle assembly of claim 9 wherein a first end surface of the pinion pin contacts the socket bottom surface.

11. The axle assembly of claim 9 wherein a through hole extends from the socket bottom surface to the inner ring hole and the pinion pin does not extend into the through hole.

12. The axle assembly of claim 9 wherein the outer ring defines a pinion pin hole that receives the pinion pin and a support surface that faces toward the axis and that encircles the pinion pin hole, and wherein a washer extends between the support surface and the pinion gear.

13. The axle assembly of claim 12 wherein the inner ring has a socket top surface that extends from the socket side surface and that is disposed substantially parallel to the support surface.

14. The axle assembly of claim 1 wherein the outer ring defines a retainer hole that receives a retainer pin that extends into the pinion pin to inhibit movement of the pinion pin with respect to the case.

15. The axle assembly of claim 1 wherein the first side gear is integrally formed with a drive gear that has a set of teeth that extend away from the axis, and wherein the drive gear meshes with a driven gear that is rotatable about a second axis with a drive pinion.

16. An axle assembly comprising:
an input shaft that is rotatable about an axis;
an output shaft that is rotatable about the axis; and
an interaxle differential unit that includes:
    a first side gear that is rotatable about the axis and is selectively couplable to the input shaft;
    a second side gear that is rotatable about the axis with the output shaft;
    a case that is rotatable about the axis with the input shaft, the case including:
        an inner ring that extends around and engages the input shaft, the inner ring defining a set of sockets that face away from the input shaft;
        an outer ring that extends around and is spaced apart from the inner ring, the outer ring defining a set of pinion pin holes; and
        a set of ribs that extends from the inner ring to the outer ring, wherein members of the set of sockets and the set of ribs are arranged such that each member of the set of sockets is positioned between two adjacent members of the set of ribs in a direction that extends around the axis;
    a set of pinion pins, wherein each pinion pin is received in a corresponding member of the set of sockets and a corresponding member of the set of pinion pin holes; and
    a set of pinion gears, wherein each pinion gear is rotatable with respect to a corresponding pinion pin and meshes with the first side gear and the second side gear.

17. The axle assembly of claim 16 wherein the case defines a plurality of cavities that each receive a corresponding member of the set of pinion gears, wherein each cavity is bounded by the inner ring, the outer ring, and two members of the set of ribs.

18. The axle assembly of claim 17 wherein each cavity receives one member of the set of pinion gears.

19. The axle assembly of claim 16 wherein each member of the set of ribs is disposed substantially perpendicular to the axis.

20. The axle assembly of claim 16 wherein each member of the set of ribs is coaxially disposed with one other member of the set of ribs.

\* \* \* \* \*